United States Patent [19]

Kawasaki et al.

[11] Patent Number: 4,777,367

[45] Date of Patent: Oct. 11, 1988

[54] METHOD AND APPARATUS FOR MEASURING THE DISTRIBUTION OF RADIOACTIVITY

[75] Inventors: Satoru Kawasaki, Hitachi; Masaharu Sakagami, Katsuta; Hiroshi Kitaguchi, Naka; Masahiro Kondo, Hitachi, all of Japan

[73] Assignee: Hitachi, Ltd., Tokyo, Japan

[21] Appl. No.: 836,426

[22] Filed: Mar. 5, 1986

[30] Foreign Application Priority Data

Mar. 8, 1985 [JP] Japan ................................ 60-44818

[51] Int. Cl.[4] ............................................ G01T 23/08

[52] U.S. Cl. ............................ 250/336.1; 250/358.1; 250/360.1; 250/393; 250/394; 250/395

[58] Field of Search ................ 378/51, 53; 250/360.1, 250/358.1, 395, 394, 393, 336.1

[56] References Cited

U.S. PATENT DOCUMENTS

| | | |
|---|---|---|
| 3,581,090 | 5/1971 | Brown . |
| 4,371,977 | 2/1983 | Jenkins, III et al. ................. 378/51 |
| 4,591,720 | 5/1986 | Fuji et al. ............................ 250/362 |

FOREIGN PATENT DOCUMENTS

| | | |
|---|---|---|
| 0114968 | 8/1984 | European Pat. Off. . |
| 40978 | 4/1974 | Japan . |

OTHER PUBLICATIONS

L. V. East, E. R. Martin, T. L. Atwell, R. H. Augustson and H. O. Manlove, "Automated Nondestructive Assay Instrumentation for Nuclear Materials Safeguards" *IEEE Transactions on Nuclear Science,* vol. NS-22 (Feb. 1975) pp. 739-743.

*Primary Examiner*—Janice A. Howell
*Assistant Examiner*—Constantine Hannaher
*Attorney, Agent, or Firm*—Fay, Sharpe, Beall, Fagan, Minnich & McKee

[57] ABSTRACT

A $\gamma$ ray emitted from a reference radioactive ray source is radiated from outside to a solid radioactive waste. The radioactive intensity of the $\gamma$ ray emitted from the solid radioactive waste is measured during the radiation of the $\gamma$ ray. The radioactive intensity to be measured is discriminated into the first radiation intensity based on the reference radioactive ray source and the second radiation intensity based on the radioactive nuclide of the solid radioactive waste. A radiation absorption coefficient of the solid radioactive waste is determined based on the first radiation intensity. The distribution of radioactivity of the solid radioactive waste is determined based on the radiation absorption coefficient and the second radiation intensity.

16 Claims, 6 Drawing Sheets

DATA PROCESSING APPARATUS
DISPLAY DEVICE
9
2
3
1
27
5
30
16
7
18
29
19
7A
28
8
17
25
24

14
13
15
11
12
10
3
20

RADIANT RAY ABSORB COEF ALU
RADIANT RAY DIST ALU
RADIANT RAY COUNTING RATE ALU
RADIANT RAY COUNTING RATE ALU
Eo PEAK AREA ALU
Eo PEAK AREA ALU
γ RAY DSCRM UNIT
γ RAY DSCRM UNIT
MEAS TIME DET
MEAS TIME DET
RADIOACTIVE NUCLIDES TABLE
RADIOACTIVE NUCLIDES DENT UNIT
RADIOACTIVE NUCLIDES DENT UNIT
CLOCK
POS SESR
MULT PHA
MULT PHA
39
40
30
5
35
38A
38B
36
37A
37B
34
42
43
33
32
41
31
24,25
27
2
D1
Dn

| PHOTOELECTRIC PEAK ENERGY(E) | RADIOACTIVE NUCLIDES |
|---|---|
| 1.17 MeV<br>1.33 MeV | $^{60}Co$ |
| 0.662 MeV | $^{137}Cs$ |
| | |
| | |

METHOD AND APPARATUS FOR MEASURING THE DISTRIBUTION OF RADIOACTIVITY

BACKGROUND OF THE INVENTION

This invention relates generally to a method and apparatus for measuring the distribution of radioactivity. More particularly, the present invention relates to a method and apparatus for measuring the distribution of radioactivity which is suitable for measuring the intensity distribution of radioactivity of nuclides existing inside an object to be measured whose internal structure is not known.

Conventional methods of measuring radioactivity are disclosed, for example, in Japanese Patent Laid-Open No. 40978/1974 and EPC Laid-Open No. 114968 (which corresponds to U.S. patent application Ser. No. 555,613, U.S. Pat. No. 4,591,720). The method of the Japanese prior art reference measures radioactivity of a body by moving up and down a pair of radiation sensors, while the method of the EPC prior art reference measures the contamination of the body surface and internal contamination of people to be measured and distinguishes the kind of radioactive nuclides on the basis of the ratio of a photoelectric effect component to a Compton scattering component obtained by the analysis of the peak of an output signal of a radiation sensor. If the contamination is judged to be internal contamination, the internal dose rate of a subject to be measured is determined.

SUMMARY OF THE INVENTION

It is an object of the present invention to provide a method and appartus for measuring the distribution of radioactivity which can measure the distribution of radioactivity of an object to be measured whose internal state cannot be grasped.

It is another object of the present invention to provide a method and apparatus for measuring the distribution of radioactivity which can accurately measure the radiation from an object to be measured.

The present invention is characterized in that the radioactivity intensity of an object to be measured is measured under the state where radiation is radiated from outside to the object containing radioactive nuclides, the intensity thus measured is then distinguished into first radioactivity intensity resulting from the external radiation and second radioactivity intensity resulting from the radioactive nuclides inside the object to be measured, and the distribution of radioactivity of the object to be measured is determined on the basis of the first and second radioactivity intensity thus distinguished.

DESCRIPTION OF THE PREFERRED EMBODIMENTS

The principle of the present invention will be first described with reference to FIG. 1 prior to the description of preferred embodiments thereof.

Figure 1:
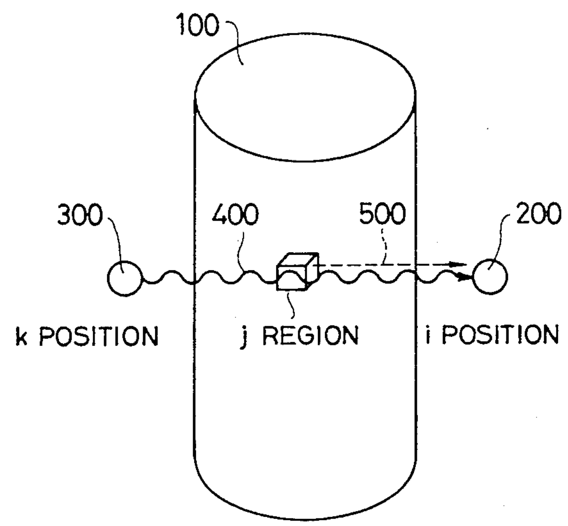
FIG. 1 is an explanatory view showing the principle of the present invention.

FIG. 1 depicts schematically the principle of the present invention. Reference numeral 100 represents an object to be measured; 200 is a radiation sensor; 300 is a reference radiation source; and 400 and 500 are rays of radiation.

A method of determining the distribution of radioactivity inside the object to be measured will now be explained.

In the system of the object shown in FIG. 1, it will be assumed that the following relation is established when the radiation sensor 200 is at an i position:

$$C_i^b = \sum_j R_{ij} \cdot A_j \qquad (1)$$

where $C_i^b$: counting rate of radiation at i position obtained by detecting the radiation 500 emitted from radioactive nuclide existing inside the object 100.

$R_{ij}$: response function, that is, counting rate of radiation detected by the radiation sensor at the i position when a radiation source having a certain unit intensity is positioned in a j region (one small region when the interior of the object 100 is imaginarily divided into very small regions), $A_j$: intensity of radioactivity in the j region.

$R_{ij}$ in eq. (1) is a quantity which is determined by the counting efficiency $\eta_{ij}$ and geometric efficiency $G_{ij}$ of the radiation sensor 200 and by the transmission factor $T_{ij}$ of the radiation. In other words, the response function $R_{ij}$ is expressed by the following formula:

$$R_{ij} = \eta_{ij} \cdot G_{ij} \cdot T_{ij} \qquad (2)$$

The counting efficiency $\eta_{ij}$ and the geometric efficiency $G_{ij}$ on the right item of eq. (2) are quantities that are determined by the relation of position between the object 100 to be measured and the radiation sensor 200, and can be determined in advance by calculation or experiments.

Next, a method of determining the transmission factor $T_{ij}$ of the radiation will be described. Since the transmission factor $T_{ij}$ of the radiation is a function of a radiation absorption coefficient, the principle of a method of determining the distribution of the radiation absorption coefficient inside the object 100 to be measured will be first explained.

The following equation is established when the reference radioactive ray source 300 whose nuclide and intensity are known is at the position k outside the object 100 to be measured and the radiation sensor 200 is at the position i:

$$l_n = \frac{C_{ki}^{ao}}{C_{ki}^{a}} = \sum_j \mu_j(E_o)X_{jki} \quad (3)$$

where $C_{ki}^{a}$: counting rate of the radiation emitted from reference radiation source 300, passing through the object to be measured and detected by the sensor 200 at the position 1 with respect to the reference radiation source 300, $C_{ki}^{ao}$: counting rate of the radiation emitted from reference radiation source and detected by sensor 200 at the position i when the object 100 does not exist, with respect to the reference radiation source 300, $\mu_j(E_o)$: radiation absorption coefficient in the j region (one small region when the inside of the object 100 is divided into very small regions) with respect to the radiant energy $E_o$ emitted from the reference radiation source 300, $X_{jki}$: pass of radiation 400 in the j region in the pass of (k−i) radiation 400.

Equation (3) given above is a linear expression. When the object 100 to be measured is determined in terms of the resolution of the n divided regions, equation (3) can be solved by moving the reference radiation source 300 and the radiation sensor 200 in such a manner that the radiation 400 passes at least once the divided small regions, and determining the m ($\geqq$n) radiation counting rates. In this manner, the distribution of the radiation absorption coefficient $\mu_j(E_o)$ inside the object 100 to be measured can also be determined. The distribution of the radiation absorption coefficient is a state quantity representing the internal structure of the object 100 to be measured.

The transmission factor $T_{ij}$ of the radiation can be calculated in accordance with the following equation by use of the radiation absorption coefficient $\mu_j(E_o)$ obtained from equation (3):

$$T_{ij} = e^{-\sum_l \mu_e(E_o) \cdot X_l} \quad (4)$$

where $T_{ij}$: transmission factor at the position i with respect to the radiation 500 emitted by the radioactivity in the j region, $\mu_e(E_o)$: radiation absorption coefficient in the very small region l in the pass of (j−i), $X_l$: pass of radiation in the very small region l.

The distribution of the intensity $A_j$ of the radioactivity (the number n of the very small regions n$\leqq$m) in equation (1) can be determined by putting the response function $R_{ij}$, which is obtained on the basis of equations (2) through (4) into equations (1) and by putting the counting rates of m radiation determined by moving the radiation sensor 200 into equation (1). The radiation counting rate $C_i^b$ can be determined on the basis of the measured value of the radiation sensor 200. In other words, this sensor 200 directly counts the number of radiation impingement thereinto within a certain predetermined period. The radiation counting rate $C_i^b$ is obtained by dividing the integration value of counting by the measurement time. The response function $R_{ij}$ is a function of the transmission factor $T_{ij}$ of the radiation which is in turn a function of the radiation absorption coefficient, and can therefore be said to be a function of the radiation absorption coefficient. The distribution of the intensity $A_j$ of radioactivity can be obtained from the radiation counting rate $C_i^b$ and the radiation ray absorption coefficient $\mu_j(E_o)$.

As can be seen clearly from FIG. 1, since the radioactivity exists in the object 100 to be measured (or since the object 100 contains a radioactive nuclide), the radiation sensor 200 simultaneously receives the radiation 400 emitted from the reference radiation source 300 and the radiation 500 emitted from the radioactive nuclide inside the object 100 to be measured. In order to independently determine the distribution of the radiation absorption coefficient inside the object to be measured and the distribution of the radioactivity inside the object, the radiation 400 and the radiation 500 must be distinguished from each other as represented by equation (3) and (1). The following three methods are available as the discrimination method: (a) a method which controls and modulates the radiation emitted from the reference radiation source 300; (b) a method which increases the energy of the radiation emitted from the reference radiation source 300 to a level above the energy of the radiation emitted from inside the object 100 to be measured; and (c) a method which first measures the radioactivity without using the reference radiation source, then stores this measured value, measures again the radioactivity by use of the reference radiation source and obtaining the difference between the former measured value and the latter. Since the energy of the radiation emitted from the reference radiation source is different from the energy of the radiation emitted from inside the object 100 to be measured, the radiation absorption coefficient obtained by use of the reference radiation source cannot be used as such for the calculation of the distribution of radioactivity in the case of the method (b) among the three methods described above, and the coefficient must be used after a certain predetermined conversion is applied (the dependence of the radiation absorption coefficient upon the energy). Since the energy dependence of the radiation absorption coefficient does not much vary from substance to substance, the conversion described above can be made. Next, the method (a) will be described.

Figure 2:
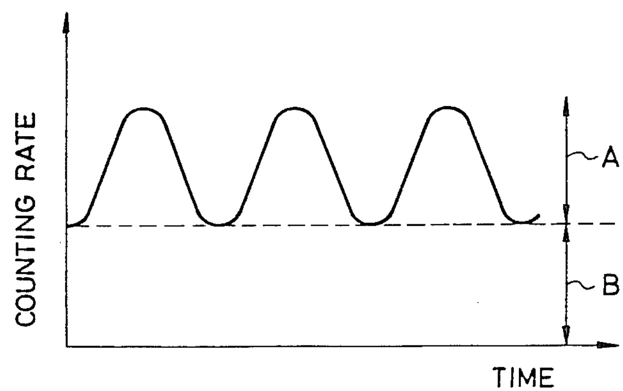
FIG. 2 is a diagram showing the change of an output signal of a radiation sensor when radiation emitted from an external reference radioactive ray source is sine-wave modulated.

FIG. 2 shows the change with time of the measurement result (counting rate) of the radiation sensor 200 when the radiation 400 emitted from the reference radiation source 300 is subjected to sine wave modulation. The portion A represent the counting rate of the radiation 400 while the portion B does the counting rate of the radiation 500. Both of them can be distinguished by passing them through a filter. It is possible to determine the counting rate of the radiation 400 from the difference between the maximum and minimum values of the changes of the counting rate, and the counting rate of the radiation 500 from the minimum value of the change of the counting rate.

An apparatus for measuring the distribution of the radioactivity in accordance with a preferred embodiment of the present invention will now be described with reference to FIGS. 3, 4 and 5. This apparatus includes a gantry 1, a radiation sensor 2, a data processing unit 5 and a reference radiation source 10.

The ring-like gantry 1 is fixedly mounted to a seat 17 by four support poles 16. N (N>0) radiation sensors 2, each being an NaI(Tl) scintillator, are disposed inside the gantry 1. The incident window for radiation of each radiation senaor 2 is opposed to the center of the gantry 1. The radiation as the object of measurement of the radiation sensor 2 is a $\gamma$ ray. A moving table 7 is fitted to the upper end of a rod 7A. An elevation rotary driving device 8 is disposed on the seat 17 below the gantry 1. Though not shown in the drawing, the elevation rotary driving device 8 meshes with the rod 7A and moves up and down and moreover, rotates the rod 7A as represented by arrows 18 and 19, respectively. Position detectors (encoders) 24 and 25 are disposed inside the elevation rotary driving device 8. The reference radiation source device 3 is disposed on the gantry 1. A fixing table 20 for this source device 3 (which will be described elsewhere) is fixed to the gantry 1.

Figure 4:
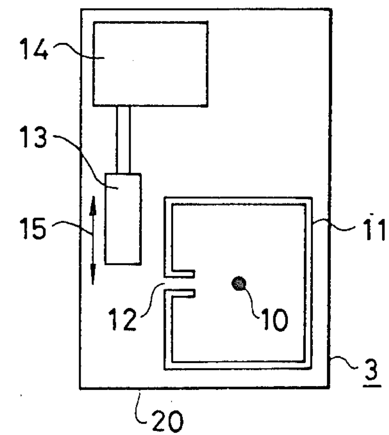
FIG. 4 is a transverse sectional view of the reference radiation source shown in FIG. 3.

The reference radiation source device 3 is equipped with a reference radiation source 10 which is fitted onto a fixed bed 20 as depicted in FIG. 4. The reference radiation source 10 emits a $\gamma$ ray as the radiation. This source 10 is encompassed by a shield member 11 having a hole 12. The shield member 11 is fitted onto the fixed bed 20 in such a manner that the hole 12 faces the center of the gantry 1. A collimator 13 is disposed in front of the hole 12 and is interconnected to a collimator driving device 14. This driving device 20 is fitted to the fixed bed 20 and moves the collimator 13 in a predetermined time interval in the direction represented by an arrow 15. Therefore, the collimator 13 repeats to open and close the hole 12 in the predetermined time interval. The intensity of the $\gamma$ ray radiated to a radioactive waste container 9, which is the object to be measured and disposed on the moving table 7, is subjected to sine wave modulation as shown in FIG. 2 by the operation of the collimator 13 described above. One of the radiation sensors 2 and the hole 12 of the reference radiation source device 3 are disposed at the positions having point symmetry with respect to the axis of the moving table 7 as viewed from above, that is, with respect to the axis of the radioactive waste container 9. The 5 ray that is emitted from the reference radiation source 10 and passes through the hole 12 then passes through the axis of the gantry 1 and is incident to the radiation sensor 2 on the opposite side.

Figure 3:
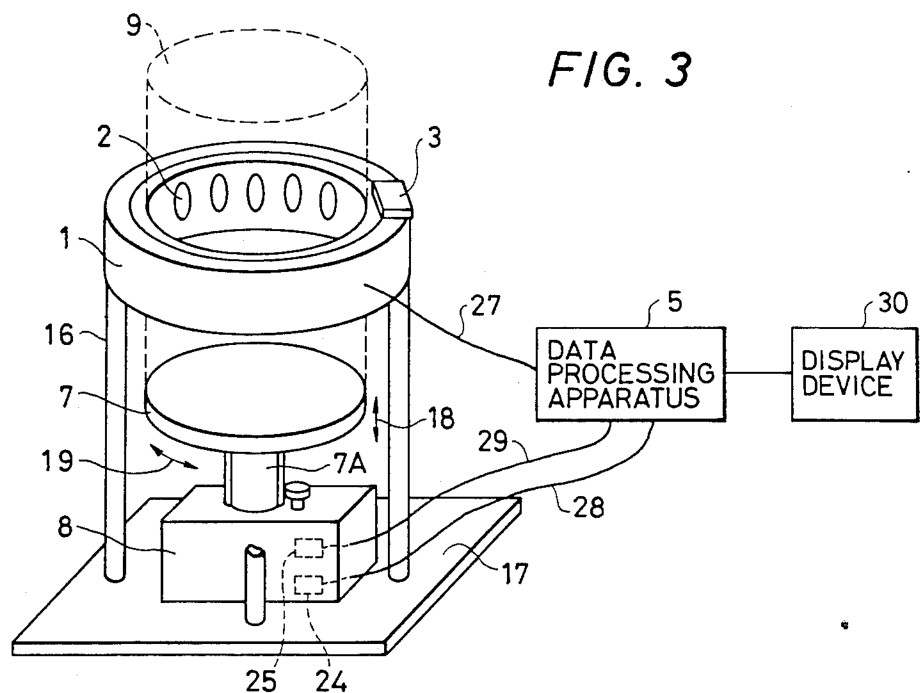
FIG. 3 is a perspective view of an apparatus for measuring the distribution of radioactivity in accordance with a preferred embodiment of the present invention.

In FIG. 3, the portions other than the data processing unit 5, that is, the gantry 1, the reference radiation source device 3, the moving table 7, the elevation rotary driving device 8, the support poles 16 and the seat 17, are covered with a radiation shield cover which is not shown in the drawing. This shield cover cuts off the radiation from outside to the radiation sensor 2 (or reduces background radiation).

Figure 5:
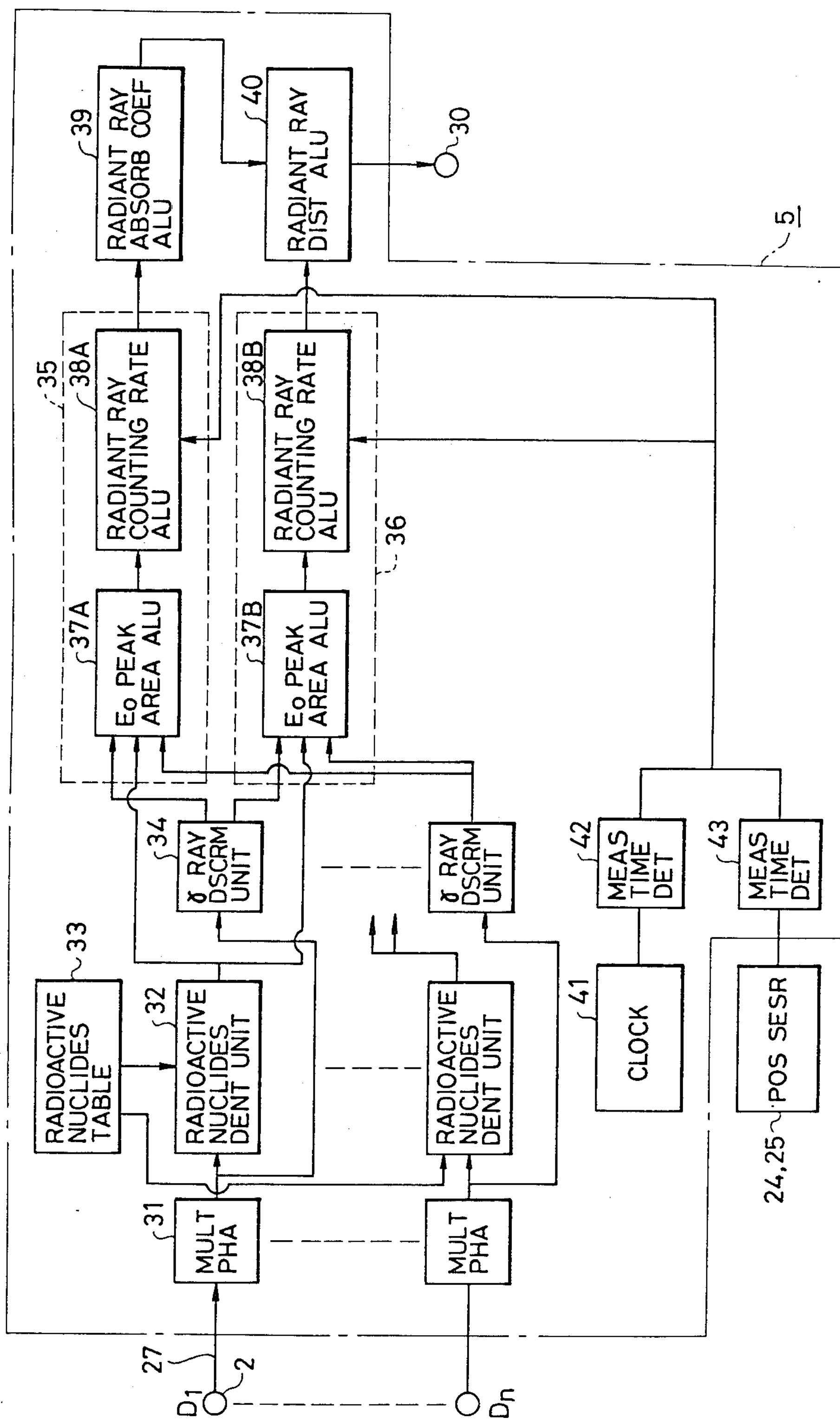
FIG. 5 is a block diagram of a data processing unit shown in FIG. 3.

The data processing unit 5 has the construction shown in FIG. 5. The data processing unit 5 consists of a multiple peak analyzer 31, a radioactive nuclide determinator 32, a $\gamma$ ray discrimination unit 34, a radiation counting rate distribution measuring device 35 for an external radiation source (reference radiation source), a radiation counting rate distribution measuring device 36 for an internal radiation source, a radiation absorption coefficient calculation unit 39, a radioactivity distribution calculation unit 40 and a measurement position calculation unit 43. Wiring 27 connects the radiation sensor 2 to the multiple peak analyzer 31. A wiring 28 connected to the position detector 24 and a wiring 29 connected to the position detector 25 are connected to the measurement position calculation unit 43.

A radioactive waste liquor is heated and concentrated in an evaporator and is then turned into powder by a centrifugal film dryer. This powder is compression-molded to pellets. A large number of pellets as the radioactive waste are packed into a drum together with a solidifier (e.g. plastic). After a lid is put, the drum is sealed. The packing density of the radioactive waste in the drum, that is, the packing density and kind of radioactive nuclides, vary with the operating condition of a plant, so that the state inside the drum cannot be known in advance.

After the radioactive waste is packed and sealed, the drum, that is, the radioactive waste container 9, is removably fixed onto the moving table 7 with each axis in conformity with the other. The elevation rotary driving device 8 is then operated so as to move the moving table 7 and hence the radioactive waste container 9, in the directions represented by the arrows 18 and 19, respectively. The movong table 7 rotates at the uppermost position of the rod 7A so that the radiation detection is effected in the circumferential direction in the proximity of the lower end of the radioactive waste container 9. Thereafter, the moving table 7 is moved a little downward and is rotated so that the radiation detection is effected at the portion a little above the first measurement portion. After this detection is completed, the moving table is rotated and lowered repeatedly and alternately until the moving table 7 reaches its lowermost position. In this manner, the intensity of the radiation, that is, the intensity of the $\gamma$ ray, is measured for the entire regions of the drum 9 in both the axial and circumferential directions. The radiation sensor 2 measures the resultant intensity of the radiation ($\gamma$ ray) 400 from the reference radiation source 10 and the radiation ($\gamma$ ray) radiated from the radioactive waste in the radioactive waste container 9. The movement of the moving table 7 in the directions of the arrows 18 and 19 is effected intermittently in the predetermined time interval so that the measurement of the radiation can be effected.

The output signal of the radiation sensor 2 is applied to the multiple peak analyzer 31 through the wiring 27. The analyzer 31 analyzes the peak values of the input signals and outputs the peak value distribution of the $\gamma$ ray energy spectra. The peak value distribution of the $\gamma$ ray energy spectrum essentially has at least two sets of photoelectric peak component P and Compton component C corresponding to at least two kinds of radioactive nuclides (one being the reference radiation source). When a plurality of radioactive nuclides exist inside the radioactive waste container 9, the photoelectric peak components and the Compton components appear in the numbers corresponding to the number of the radioactive nuclides that exist.

Figures 6, 7:
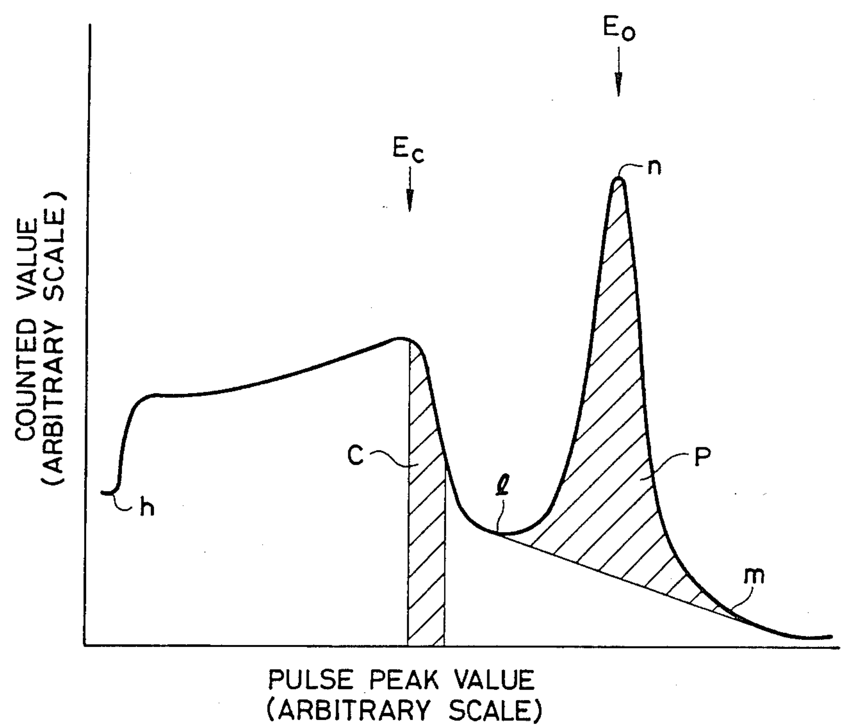
FIG. 6 is an explanatory view of the peak distribution of a $\gamma$ ray energy spectrum.
FIG. 7 is a table showing the photoelectric peak energy of radioactive nuclides.

FIG. 6 shows the peak value distribution of the $\gamma$ ray energy spectrum having one set of photoelectric peak component P and Compton component C.

The $\gamma$ ray energy spectrum outputted from the multiple peak analyzer 31 is inputted to the radioactive nuclide determination unit 32. This unit 32 determines the radioactive nuclides in the number corresponding to the number of photoelectric peaks contained in the $\gamma$ energy spectrum in the same way as the determination steps of the radioactive nuclides described in on page 11, line 9 to page 12, line 15 and shown in FIG. 7 of the specification of European Patent Laid-Open No. 114968. In other words, the radioactive nuclide having the photoelectric peak energy E which is equal to the photoelectric peak energy $E_o$ of the photoelectric peak component C is selected from the radioactive nuclide table 33, thereby determining the radioactive nuclide that corresponds to each photoelectric peak. The radioactive nuclide table 33 stores therein the photoelectric peak energy E of each radioactive nuclide shown in FIG. 7.

The γ ray discrimination unit 34 receives as its input signal the peak value distribution which is the output of the multiple peak analyzer 31. The γ ray discrimination unit 34 discriminates the peak value distribution of the γ ray energy spectrum outputted from the multiple peak analyzer 31 into the peak value distribution of the γ ray energy spectrum due to the radiation (γ ray) 400 from the reference radiation source 10 and the peak value distribution of the γ ray energy spectrum due to the radiation (γ ray) 500 from the radioactive nuclide in the radioactive waste container 9. Since the intensity of the γ ray radiated from the reference radiation source 10 to the radioactive waste container 9 is subjected to sine wave modulation, the peak value distribution of the energy spectrum can be easily discriminated into those of the radiation 400 (B portion in FIG. 2) and the radiation 500 (A portion in FIG. 2) as described already.

The peak value distribution of the γ ray energy spectrum of the radiation 400 thus discriminated by the γ ray discrimination unit 34 is applied to the photoelectric peak area calculation unit 37A of the radiation counting rate distribution measuring device 35. The peak value distribution of the γ ray energy spectrum of the radiation 500 discriminated by the γ ray discrimination unit 34 is applied to the photoelectric peak area calculation unit 34B of the radiation counting rate distribution measuring device 36. The data of the radioactive nuclides determined by the radioactive nuclide determination unit 32 are also applied to the photoelectric peak area calculation units 37A and 37B, respectively.

N radiation sensor 2, i.e. $D_1-D_n$, are disposed inside the gantry 1. The multiple peak analyzer 31, the radioactive nuclide determination unit 32 and the γ ray discrimination unit 34 are to process the output signals of the radiation sensor 2 or $D_1$. The data processing unit 5 includes the multiple peak analyzers 31, the radioactive nuclide determination units 32 and the γ ray discrimination unit 34 for processing the output signals of the rest of radiation sensors, i.e. $D_2-D_n$. In other words, N each multiple peak analyzers 31, radioactive nuclide determination units 32 and γ ray discrimination units 34 are disposed.

Each radioactive nuclide determination unit 32 of $D_2-D_n$ and each γ ray discrimination unit 34 of $D_2-D_n$ apply the same output signals as those of the radioactive nuclide determination unit 32 and the γ ray discrimination unit 34 that receive the output signals of the radiation sensor 2 of $D_1$, to the photoelectric peak area calculation units 37A and 37B, respectively.

The γ ray emitted from the reference radiant source 10 and passing through the hole 12 gradually expands in the fan-like shape and reaches the radiation sensor 2. Therefore, the γ ray 400 from the reference radiation source 10 is incident not only to the $D_1$ radiation sensor 2 which is point-symmetric with the hole 12 with respect to the axis of the moving table 7 as viewed from above but also to several radiation sensors 2 on the right and left with the $D_1$ radiation sensor 2 being the center. The γ ray from the reference radiation source 10 is not incident to the other radiation sensors 2, but only the γ ray 500 radiated from the radioactive waste container 9 disposed on the moving table 7 is incident to them. Therefore, the γ ray discrimination units 34 corresponding to all those radiation sensors 2 to which the γ ray 400 from the reference radiation source 10 is incident output the peak distribution of the γ ray energy spectrum due to the γ ray 400 to the photoelectric peak area calculation units 37A and the peak value distribution of the γ ray energy spectrum due to the γ ray 500 to the peak area calculation units 37B, respectively. Those γ ray discrimination units 34 which receive the outputs of all those radiant ray sensors 2 to which only the γ ray 500 are incident output the peak value distribution of the γ ray energy spectrum for the γ ray 500 (which is the same as the peak value distribution of the γ ray energy spectrum outputted from the corresponding multiple peak value analyzers 31) to the photoelectric peak area calculation units 37B.

The expanding angle of the γ ray 400 from the reference radiation source 10 can be almost expected. Therefore, it is possible to omit all those γ ray discrimination units 34 which receive the outputs of all the radiation sensors 2 at the positions where the γ ray 400 is not incident to them, and to apply the outputs of the multiple peak analyzers 31 receiving the outputs of such discrimination units 34 to the photoelectric peak area calculation units 37B.

The radiation counting rate distribution measuring devices 35 and 36 have radiation counting rate distribution calculation units 38A and 38B, respectively.

The photoelectric peak area calculation unit 37A determines the area of the photoelectric peak in the peak value distribution of the γ ray energy spectrum for the ray 400 (that is, the photoelectric peak for each radioactive nuclide of the reference radiation source 10) for each radioactive nuclide (the reference radiation source 10 generally contains one kind of radioactive nuclide). The method of determining the area of the photoelectric peak will be described with reference to FIG. 6. This area corresponds to the area of the portion which is above a line lm connecting a skirt point l of the photoelectric peak on the low energy side to a skirt point m on the high energy side. In other words, the area of the photoelectric peak corresponds to the area of the oblique line portion encompassed by the points l, m and n in the drawing.

The output signals of the position sensors 24 and 25 are applied to the measurement position calculation units 43 through the wirings 28 and 29, respectively. The measurement position calculation unit 43 determines the position of the detection of radioactivity of the radioactive wave container 9. The positions detected by the position sensors 24 and 25 are the positions on the surface of the radioactive waster container 9 which is on the axis of the $D_1$, and faces, the radiation sensor 2 at the point-symmetric position with the reference radiation source relative to the axis of the moving table as viewed from above. In this manner, the radiation detection position by the $D_1$ radiation sensor 2 is determined, and the radiation detection positions by the other $D_2-D_n$ radiation sensors 2 can likewise be determined. Since the mutual gaps between the $D_1-D_n$ radiation sensors 2 are equidistant, the radiation detection positions by the $D_2-D_n$ radiation sensors 2 can be easily determined by use of the radiation detection position by the $D_1$ radiation sensor 2 as the reference.

The measurement time detection unit 42 measures the period of time in which the movement of the moving table 7 is stopped and the measurement of the radiation is effected, by receiving the clock pulses from the clock generator 41. On the contrary, the elevation rotary driving device 8 may be controlled by the time interval measured by the measurement time detection unit 42 in order to rotate and move up and down the moving table 7.

The radiation detection position determined by the measurement position calculation unit 43 and the measurement time at one radiation detection position obtained by the measurement time detection unit 42 are applied to the radiation counting rate distribution calculation units 38A and 38B. The radiation counting rate distribution calculation unit 38A determines $C_{ki}^{a}$ distribution of the radiation counting rate (inside the radioactive waste container 9) for the $\gamma$ ray 400 emitted from the reference radiation source 10 for each radioactive nuclide of the reference radiation source 10 on the basis of the photoelectric peak area outputted from the photoelectric peak area calculation unit, the radiation measurement position and the measurement time. The $C_{ki}^{a}$ distribution of this radiation counting rate represents the distribution in the axial and circumferential directions of the radioactive waste container 9.

The photoelectric peak area calculation unit 37B determines the photoelectric peak area in the peak value distribution of the $\gamma$ ray energy spectrum for the input $\gamma$ ray 500 for each radioactive nuclide. The radiation counting rate distribution calculation unit 38B determines the $C_i^{k}$ distribution of the radiation counting rate for the $\gamma$ ray 500 in the radioactive waste container 9 on the basis of the photoelectric peak area for each radioactive nuclide that is outputted from the photoelectric peak area calculation unit 37B, the radiation measurement position and the measurement time. This $C_i^{k}$ distribution of the radiation counting rate represents also the distribution in the axial and circumferential directions of the radioactive waste container 9.

The radiation counting rate distribution $\Sigma C_{ki}^{a}$ for the $\gamma$ ray 400 obtained from the radiation counting rate distribution calculation unit 38A is outputted to the radiation absorption coefficient calculation unit 39. The radiant ray counting rate distribution $\Sigma C_{k}^{a}$ for the ray 500 for each radioactive nuclide obtained from the radiation counting rate distribution calculation unit 38B is outputted to the radioactivity distribution calculation unit 40.

The radiation absorption coefficient calculation unit 39 determines the response function $R_{ij}$, which is a function of the radiation absorption coefficient, on the basis of equations (2), (3) and (4). In other words, it determines the radiation absorption coefficient $\mu_j(E_o)$ by putting the individual radiation counting rate $C_{ki}^{a}$ of the radiation counting rate distribution outputted from the radiation counting rate distribution calculation unit 38A into equation (3). The radiation counting rate $C_{ki}^{ao}$ is determined in advance under the state where the radioactive waste container 9 is not put on the moving table 7. As described already, the response function $R_{ij}$ can be obtained by putting the resulting radiation absorption coefficient $\mu_j(E_o)$ into equation (4) and putting the resulting transmission factor $T_{ij}$ of the radiation into equation (2). The response function $R_{ij}$ is determined for each radioactive nuclide contained in the reference radiation source 10. Since the radioactive nuclide is only one kind in this embodiment, one kind of response function $R_{ij}$ is obtained.

The radioactivity distribution calculation unit 40 determines the radioactivity distribution on the basis of equation (1). In other words, the intensity $A_j$ of radioactivity for each radioactive nuclide for the radioactive waste container 9 can be obtained by putting the response function $R_{ij}$ obtained from the radiation absorption coefficient calculation unit 39 and the individual radiation counting rate $C_i^{b}$ of the $C_i^{b}$ distribution of the radiation counting rates obtained from the radiation counting rate distribution counting unit 38B into equation (1). The distribution of the intensity $A_j$ of radioactivity for each radioactive nuclide can be obtained by determining the intensity $A_j$ of radioactivity at each position of the radioactive waste container 9. However, the response function $R_{ij}$ outputted from the radiation absorption coefficient calculation unit 39 is for the radioactive nuclide of the reference radiation source 10 but not for all the radioactive nuclides determined by the radioactive nuclide determination unit 32. For this reason, the radioactivity distribution calculation unit 40 determines the response function $R'_{ij}$ for other radioactive nuclides from the ratio of the photoelectric peak energy E of one radioactive nuclide of the reference radiation source to the photoelectric peak energy E of the other radioactive nuclides contained in the radioactive waste container 9. The response function $R'_{ij}$ corresponding to each of the various radioactive nuclides is put into equation (1).

The distribution of the radioactivity intensity $A_j$ for each radioactive nuclide obtained from the radioactivity distribution calculation unit 40 is outputted to and displayed by the display 30.

Since the embodiment described above uses the external radiation source (the reference radiation source 10), the packing state of the material packed into the radioactive waste container 9 is not known, but the kinds of the radioactive nuclides inside the container 9 and the intensity of radioactivity can be determined while the container is kept sealed or without opening the same. If the object to be measured is a human body, the positions of the internal organs are known in advance, and at the same time, the distribution of the intensity of radioactivity can be obtained three-dimensionally. Particularly, these data can be obtained by automatic measurement which eliminates labor. This also results in the reduction of exposure of operators to the radioactivity. Since the intensity distribution for each radioactive nuclide can be obtained, the distribution of radioactive nuclides inside the radioactive waste container 9 can be known.

Since a large number of radiation sensors 2 are disposed for one reference radiation source 10 in accordance with the embodiment described above, the radiation counting rate $C_i^{b}$ for the $\gamma$ ray 500 of the radioactive waste container 9 can be measured accurately. For, the radiation sensor(s) 2 which the $\gamma$ ray 400 from the reference radiation source 10 is not incident can measure only the $\gamma$ ray 500 from the radioactive waste container 9 without being affected by the $\gamma$ ray 400.

Though this embodiment measures both of the $\gamma$ rays 400 and 500 or only the $\gamma$ ray 500, the measurement can be completed relatively quickly.

The embodiment given above uses as such equations (1) and (3). However, since this method determines the radioactivity distribution of the radioactive waste container 9 with an extremely high level of spatial resolution, it is not effective when the measurement is to be made with practically rough resolution. Therefore, this embodiment uses the following equations (5) and (6):

$$Z = \sum_i W_i\left(Y_j - \sum_j B_{ij} \cdot X_j\right)^2 \rightarrow \min \tag{5}$$

-continued $$X_j \geqq 0 \quad (6)$$

Here, $Y_i$, $B_{ij}$ and $W_i$ become $C_{ki}^{ao}/C_{ki}^{a}$, $x_{jki}$ and $\mu_j(E_o)$ when the radiation absorption coefficient $\mu_j(E_o)$ is to be obtained, respectively, and become $C_i^b$, $R_{ij}$ and $A_j$ when the intensity of $A_j$ of radioactivity is to be determined, respectively. The value $W_i$ is a quantity inversely proportional to the dispersion of the error of the measured value $Y_i$.

Equations (5) and (6) show an actual method of solving the simultaneous linear equation shown by equations (1) and (3). Equations (1) and (3) can be expressed in the form:

$$Y_i = \sum_{j=1}^{n} B_{ij} \cdot X_j \, (i = 1, \ldots, m) \quad (7)$$

Here, $B_{ij}$ is a known value while $Y_i$ is a measured value and hence a known value. Therefore, if $m \geqq n$, equation (7) can be solved for $X_j$. This is a problem of the method of least squares, and can be solved as $X_j$ which makes equation (5) minimal. Equation (6) expresses a physical limit condition. Equation (5) can be determined more accurately by taking this physical limit condition into consideration.

Figure 8:
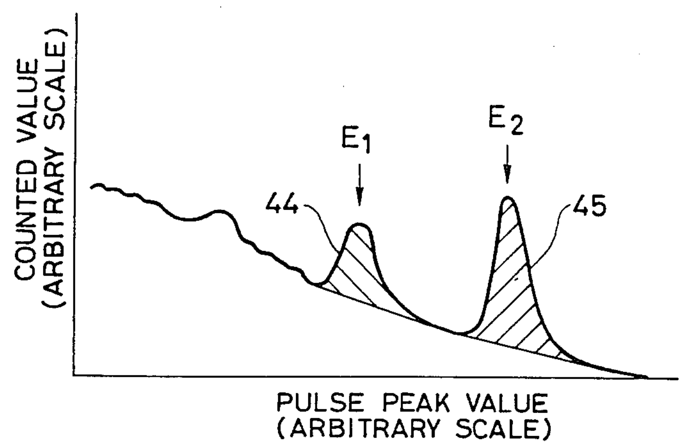
FIG. 8 is a diagram showing a method of discriminating $\gamma$ rays in accordance with another embodiment.

FIG. 8 shows another embodiment for discriminating the $\gamma$ rays. Only the $\gamma$ ray emitted from inside the radioactive waste container 9 is measured by the radiation sensor 2 before the intended measurement is made. The radioactive nuclide existing in the radioactive waste container 9 is determined from the peak value distribution of the output signals from the radiation sensors 2. At this time, $E_1$ represents the maximum energy of the $\gamma$ ray radiated from inside the radioactive waste container 9. The reference radiation source for the $\gamma$ ray CT uses a radioactive nuclide emitting a monochromic energy $E_2$ ($>E_1$) higher than the energy $E_1$. The $\gamma$ ray for the $\gamma$ ray CT is detected without subjecting it to modulation. At this time, the area 44 shown in FIG. 6 relies upon the radiation from inside the radioactive waste container while the area 21 does on the radiation from the reference radiation source 10. In other words, both of them can be discriminated. In this embodiment, the collimator 13 for modulating the reference radiation source and the $\gamma$ ray discriminator 34 are not necessary and hence the construction can be simplified as much.

Figure 9:
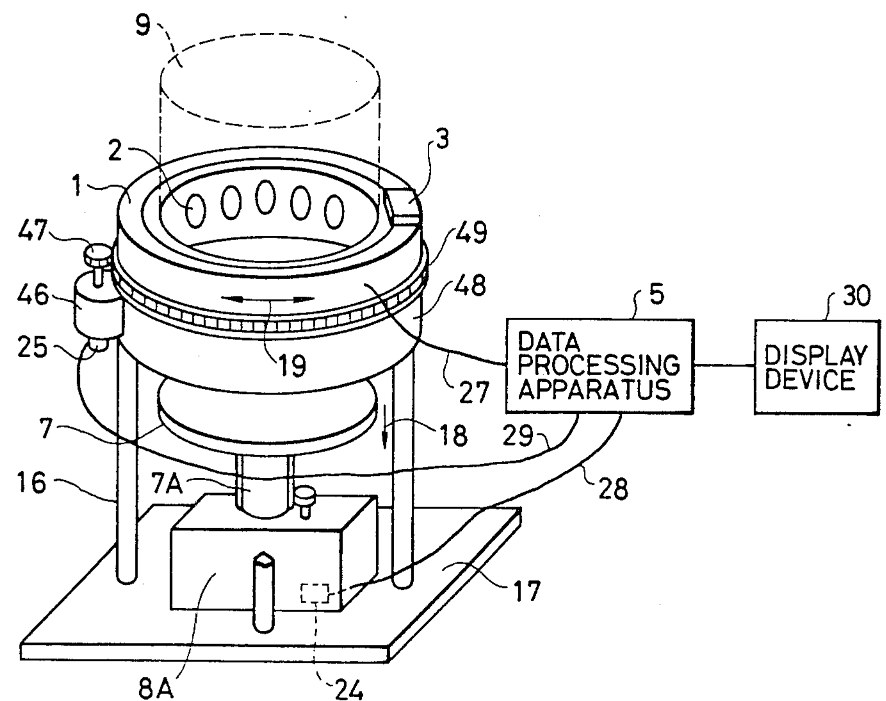
FIGS. 9 through 11 are structural views of the apparatus for measuring the distribution of radioactivity in accordance with still another embodiment of the invention.

FIG. 9 depicts the apparatus for measuring the distribution of radioactivity in accordance with still another embodiment of the present invention. The apparatus of this embodiment has substantially the same construction as the apparatus shown in FIG. 3. The difference between them is that the gantry 1 is disposed rotatably on a rail 48. A ring-like rack 49 is disposed on the side surface of the gantry 1. A motor 46 is mounted to the side surface of the rail 48. A pinion is fitted to the motor 46 and meshes with the rack 49. When driven by the motor, the gantry 1 rotates on the rail in the direction represented by an arrow 19. The position sensor 25 (encoder) is interconnected to the rotary shaft of the motor 46. The elevation driving device 8A disposed on the seat 17 moves up and down the moving table 7. This moving table 7 does not rotate. This embodiment provides the same effect as that of the embodiment shown in FIG. 3.

Figure 10:
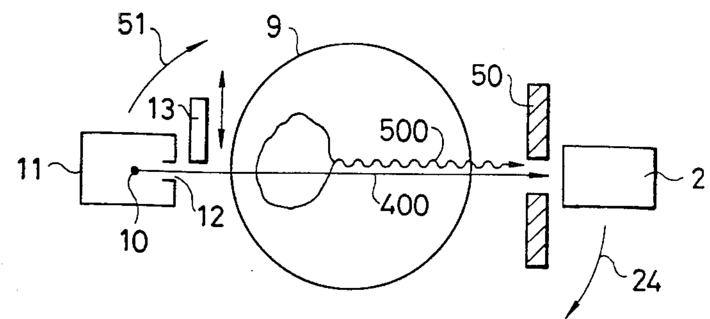

FIG. 10 shows the apparatus for measuring the distribution of radioactivity in accordance with still another embodiment of the present invention. In the embodiment shown in FIG. 9, this embodiment disposes one radiation sensor 2 and the reference radiation source device 3 on the rotatable gantry 1. The radiation sensor 2 is not disposed inside the gantry 1. The radiation sensor 2 is point-symmetric with the hole 12 of the reference radiation source device 3 with respect to the axis of the moving table 7 as viewed from above. The radiation sensor 2 is equipped with the collimator 50 on the front surface of the radiation incidence window which collimator allows the passage of only the radiation perpendicularly incident to the radiation sensor 2. The collimator 50 is fixed to the gantry 1. The gantry 1 equipped with one set of radiation sensor 2 and reference radiation source device 3 is rotated in the direction represented by an arrow 51 when the motor 46 is actuated.

Since the reference radiation source 10 and the radiation sensor 2 oppose each other in this embodiment, the radiation sensor 2 which detects only the $\gamma$ ray 500 does not exist. Therefore, in comparison with the embodiment shown in FIG. 3, the measuring accuracy of the radiation counting rate $C_i^b$ somewhat drops in this embodiment. Except for this point, this embodiment provides the same effect as that of the embodiment shown in FIG. 3.

Since this embodiment detects only the $\gamma$ ray which is perpendicularly incident to the radiation sensor 2, data processing in the data processing unit 5 becomes simple. Since the number of mechanical components and the number of the radiation sensors 2 can be reduced, a more practical apparatus can be accomplished. Though this embodiment uses one set of reference radiation source and radiation sensor opposing each other, the measurement time can be drastically shortened if a plurality of sets of reference radiation sources and radiation sensors opposing one another are employed. In other words, when N sets are used, the measurement time becomes 1/N of the embodiment using only one set.

Figure 11:
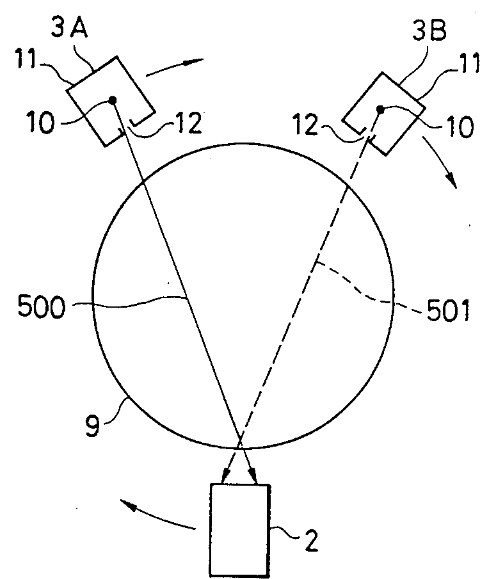

FIG. 11 shows still another embodiment of the present invention. In this embodiment, two reference radiation source devices 3A and 3B and one radiation sensor 2 are disposed on the gantry 1 of the embodiment shown in FIG. 9. Unlike the embodiment shown in FIG. 9, this embodiment does not include a large number of radiation sensors 2 inside the gantry 1. The rest of the constructions are the same as those of the embodiment shown in FIG. 9. The two radiation source devices 3A and 3B are symmetric with each other with respect to a line connecting the radiation sensor 2 to the axis of the moving table 7. The energy of the $\gamma$ ray emitted from the reference radiation sources disposed on the reference radiation source devices 3A and 3B is different, and these sources use a substance having higher energy than the energy of the radiation emitted from the radioactive nuclide inside the radioactive waste container 9.

The data processing unit 5 can easily discriminate that the radiations 500 and 501 are radiated from the reference radiation source devices 3A and 3B, respectively. Therefore, in this embodiment, too, the distribution of each radioactive nuclide inside the radioactive waste container 9 can be obtained. Since the number of the reference radiation sources is great, the measurement time can be reduced drastically. This embodiment can provide the same effect as that of the embodiment shown in FIG. 9. Though this embodiment uses two external reference radiation sources and one radiation sensor, a plurality each of external reference radiation source and radiation sensors can be used. In this case, the measurement time can be further shortened.

In the embodiment described above, a plurality of reference radiation sources having different γ ray energy are used, but the γ rays emitted from the reference radiation sources can be modulated at different frequencies in order to make discrimination.

In the embodiments given above, the radiation from the reference radiation sources and the radiation from inside the radioactive waste container 9 are simultaneously discriminated and collected. However, it is possible to discriminate the radiation from the reference radiation source by first measuring the radiation only from inside the radioactive waste container 9 without using the reference radiation sources, then measuring the radiation by use of the reference radiation sources and thereafter reducing the former value from the latter.

Though the embodiments given above are directed to measure the radiation of the radioactive waste container, the present invention can also measure the radiation of people as the object to be measured. In this case, three-dimensional form (γ CT) and function (emission CT) can be measured simultaneously, and more valuable data can be expected.

Since the present invention makes use of the external radiation source(s), the present invention can determine the distribution of radioactivity of the object to be measured even when the internal state of the object cannot be grasped (such as the object whose internal structure cannot be grasped).

What is claimed is:

1. A method of measuring three-dimensional distribution of radioactivity, which comprises:

measuring with a radiation sensor the intensity of radiation of an object containing radioactive nuclides while external radiation is radiated through said object from outside said object;

imparting relative rotational and up and down movement between a source of said external radiation and said radiation sensor, and said object, while measuring said intensity of radiation at a plurality of segments during said up and down movement over the length of said object and at a plurality of regions within each of said segments during said rotational movement;

discriminating the intensity of radiation thus measured into first radiation intensity based on said external radiation and second radiation intensity based on a radioactive nuclide in said object;

determining a radiation absorption coefficient of said object on the basis of said first radiation intensity; and determining the distribution of radioactivity of said object in three dimensions on the basis of said radiation absorption coefficient and said second radiation intensity.

2. A method of measuring the distribution of radioactivity according to claim 1 which comprises the steps of determining the γ ray energy spectrum of said radiation intensity of said object thus measured, determining said radioactive nuclide on the basis of photoelectric peak energy of said γ ray energy spectrum, and determining the distribution of radioactivity of said object for each radioactive nuclide.

3. An apparatus for measuring three-dimensional distribution of radioactivity, which comprises:

an external radiation source disposed outside an object, which object contains a radioactive nuclide;

radiation sensor means disposed outside said object in such a manner as to interpose said object between said radiation sensor means and said external radiation source, for sensing radiation;

means for imparting relative up and down movement between said external radiation source and radiation sensor means, and said object, to expose said object to said radiation source at a plurality of segments extending over the length of said object, and for imparting relative rotational movement between said external radiation source and radiation sensor means, and said object, to obtain output signals from said radiation sensor means at a plurality of regions within each of said segments during said rotational movement;

means for discriminating the output signal from said radiation sensor means into first radiation intensity emitted from said external radiation source and second radiation intensity emitted from said radioactive nuclide inside said object;

means for determining a radiation absorption coefficient of said object from said first radiation intensity; and radioactivity distribution calculation means for determining three-dimensional distribution of radioactivity within said object on the basis of said radiation absorption coefficient and said second radiation intensity.

4. An apparatus for measuring the distribution of radioactivity according to claim 3 wherein said imparting means comprises means for moving said object up and down and for rotating said object.

5. An apparatus for measuring the distribution of radioactivity according to claim 4 which further comprises means for subjecting the intensity of radiation emitted from said external radiation source to sine wave modulation.

6. An apparatus for measuring the distribution of radioactivity according to claim 4 wherein a radioactive nuclide having higher radiant energy that the energy of said radioactive nuclide existing inside said object, is used as said external radiation source.

7. An apparatus for measuring the distribution of radioactivity according to claim 3 wherein said imparting means comprises means for moving said object up and down and means for rotating said external radiation source and said radiation sensor means around said object.

8. An apparatus for measuring the distribution of radioactivity according to claim 7 which further comprises means for subjecting the intensity of radiation emitted from said external radiation source to sine wave modulation.

9. An apparatus for measuring the distribution of radioactivity according to claim 7 wherein a radioactive nuclide having higher radiant energy than the energy of said radioactive nuclide existing inside said object, is used as said external radiation source.

10. An apparatus for measuring the distribution of radioactivity according to claim 3 which further comprises means for determining the ray energy spectrum of the radiation intensity of said object, means for determining a radioactive nuclide on the basis of said ray energy spectrum, and said radioactivity distribution calculation means for determining the distribution of radioactivity for each of said radioactive nuclide obtained.

11. An apparatus for measuring the distribution of radioactivity according to claim 10 wherein said imparting means comprises means for moving said object up and down and rotating said object.

12. An apparatus for measuring the distribution of radioactivity according to claim 11 which further comprises means for sinusoidally modulating the intensity of radiation emitted from said external radiation source.

13. An apparatus for measuring the distribution of radioactivity according to claim 11 wherein a radioactive nuclide having higher radiant energy than the energy of said radioactive nuclide existing inside said object is used as said external radiation source.

14. An apparatus for measuring the distribution of radioactivity according to claim 10 wherein said imparting means comprises means for moving said object up and down, and means for rotating said external radiation source and said radiation sensor means around said object.

15. An apparatus for measuring the distribution of radioactivity according to claim 12 which further comprises means for sinusoidally modulating the intensity of radiation emitted from said external radiation source.

16. An apparatus for measuring the distribution of radioactivity according to claim 14 wherein a radioactive nuclide having higher radiant energy than the energy of said radioactive nuclide existing inside said object to be measured is used as said external radiation source.

* * * * *